United States Patent
Hoo

(10) Patent No.: US 7,526,037 B2
(45) Date of Patent: Apr. 28, 2009

(54) REDUCED COMPLEXITY DETECTOR FOR MULTIPLE-ANTENNA SYSTEMS

(75) Inventor: Min Chuin Hoo, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 594 days.

(21) Appl. No.: 11/027,106

(22) Filed: Dec. 31, 2004

(65) Prior Publication Data

US 2006/0146950 A1     Jul. 6, 2006

(51) Int. Cl.
*H04B 7/02*     (2006.01)
(52) U.S. Cl. .................. 375/267; 375/262; 375/341; 375/260; 375/229; 714/794; 714/795; 714/797
(58) Field of Classification Search ............... 375/267, 375/262, 260, 341, 229, 347, 350; 714/794, 714/797, 795
See application file for complete search history.

(56) References Cited

U.S. PATENT DOCUMENTS

| 6,487,254 | B1 * | 11/2002 | Goeddel ............... 375/261 |
| 2002/0131515 | A1 * | 9/2002 | Rodriguez ............ 375/262 |
| 2004/0242179 | A1 * | 12/2004 | Onggosanusi et al. ...... 455/296 |

OTHER PUBLICATIONS

Jacky Ho-Yin Fan et al. "Near maximum likelihood detection schemes for wireless MIMO systems", Sep. 2004, IEEE transactions on wireless communications, vol. 3, pp. 1427-1430.*

B. Steingrimsson et al, "Quasi-ML detectors with soft output and low complexity for PSK modulated MIMO channels", Jun. 15-18, 2003, IEEE workshop on signal processing advances in wireless communication, pp. 427-431.*

Li et al. "reduced-complexity detection algorithms for systems using multi-element arrays",2000, Lucent techonologies, pp. 1072-10176.*

Jacky Ho-Yin Fan et al., "Near Maximum Likelihood Detection Schemes for Wireless MIMO Systems," IEEE Transactions on Wireless Communications, vol. 3, No. 5, Sep. 2004, Abstract, XP002376106, Hong Kong.

B. Steingrimsson et al., "Quasi-ML Detectors with Soft Output and Low Complexity for PSK Modulated MIMO Channels," Signal Processing Advances in Wireless Communications, 2003, SPAWC, 4th IEEE Workshop on Time, Italy, Jun. 15-18, 2003.

* cited by examiner

*Primary Examiner*—David C Payne
*Assistant Examiner*—Rahel Guarino
(74) *Attorney, Agent, or Firm*—Garlick Harrison & Markison

(57) ABSTRACT

A reduced-complexity maximum-likelihood detector is disclosed that provides a high degree of signal detection accuracy while maintaining high processing speeds. The detector processes the received symbols to obtain initial estimates of the transmitted symbols and then uses the initial estimates to generate a plurality of reduced search sets. The reduced search sets are then used to generate decisions for detecting the transmitted symbols.

12 Claims, 9 Drawing Sheets

TX1:$b_1b_2b_3b_4$

TX2:$b_5b_6b_7b_8$

REDUCED COMPLEXITY DETECTOR FOR MULTIPLE-ANTENNA SYSTEMS

BACKGROUND OF THE INVENTION

1. Field of the Invention

The present invention is directed in general to wireless communication systems. In one aspect, the present invention relates to a method and system for improving the performance of wireless transceivers by providing an improved detector for multiple-antenna systems.

2. Description of the Related Art

Modern communication systems support wireless and wire-lined communications between a wide variety of wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth (BT), advanced mobile phone services (AMPS), digital AMPS, global system for mobile communications (GSM), code division multiple access (CDMA), local multi-point distribution systems (LMDS), multi-channel-multi-point distribution systems (MMDS) and/or variations thereof.

Depending on the type of wireless communication system, a wireless communication device (such as a cellular telephone, two-way radio, personal digital assistant (PDA), personal computer (PC), laptop computer, home entertainment equipment, etc.) communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over the tuned channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switched telephone network, via the Internet, and/or via some other wide area network.

Wireless communication devices typically communicate with one another using a radio transceiver (i.e., receiver and transmitter) that may be incorporated in, or coupled to, the wireless communication device. The transmitter typically includes a data modulation stage, one or more intermediate frequency stages and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna.

The receiver is typically coupled to an antenna and includes a low noise amplifier, one or more intermediate frequency stages, a filtering stage and a data recovery stage. The low noise amplifier receives inbound RF signals via the antenna and amplifies them. The intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

In wireless communication systems utilizing the various 802.11 standards, the allowable bandwidth is set by standard-setting associations and governmental agencies. To achieve higher data throughput, many later generation wireless systems, such as those based on the 802.11n standard use Multiple Input Multiple Output (MIMO) antenna systems. MIMO systems use multiple transmit antennas to transmit multiple data streams in the same frequency spectrum and take advantage of multipath channels with a plurality of receive antennas being used to recover the information transmitted over the various data streams. Thus in a MIMO system, information is transmitted and received simultaneously using multiple transmit and receive antennas. In such a system, each pair of transmit and receive antennas defines a signal path from the transmitter to the receiver.

MIMO technology has been adopted by the Institute for Electrical and Electronic Engineers (IEEE) for the next generation wireless local area network (WLAN) to provide a throughput of at least one hundred Mbps. Transmission protocols and standards for such a high throughput (WLAN) are embodied in a standard referred to as 802.11n. Since 802.11n is a MIMO extension of current WLAN standards, such as 802.11a and 802.11g, 802.11n will also be based on the transmission scheme referred to as orthogonal frequency division multiplexing (OFDM).

A MIMO system can provide two types of gain: (1) diversity gain, and (2) spatial multiplexing gain. Diversity gain is realized when signals carrying the first information are sent via different paths. This multipath transmission increases the robustness of transmission or the reliability of reception. Spatial multiplexing gain is realized when signals carrying independent information are sent in parallel via different paths. This increases the length throughput or the data rate of the wireless communication system.

In MIMO systems, there is a need to obtain an estimate of the transmitted signal with a high degree of accuracy. However, there is an inherent tradeoff between maximum accuracy and the speed of processing the signal. The optimum detector is a maximum-likelihood detector. Given the received symbol vector y, the maximum-likelihood detector searches over all possible transmitted symbol vectors $x_j$ for the transmit vector that maximizes the conditional probability $Pr\{x_j/y\}$, thereby minimizing the probability of decoding error at the receiver. This best transmit symbol vector represents a hard decision. Since communication systems will employ some form of coding, to improve performance further, the output of the maximum-likelihood detector should be a measure of reliability of each transmitted bit. These reliabilities are also known as soft decisions. However, the maximum-likelihood detector involves searching over all the possible combinations of transmit symbols. For a system with multiple transmit antennas, the complexity grows exponentially with the number of transmit antennas. Hence, reduced-complexity schemes that still give comparable performance to the optimum maximum-likelihood detector is necessary.

SUMMARY OF THE INVENTION

The method and apparatus of the present invention provides a reduced-complexity maximum-likelihood detector that provides a high degree of signal detection accuracy while maintaining high processing speeds. The reduced-complexity maximum-likelihood detector of the present invention uses a reduced search set of all possible transmit symbols. As will be understood by those of skill in the art, limiting the search set too much can result in poor detection, thereby degrading system performance. However, a search set that is too large can result in increased latency. The method and apparatus of the present invention uses estimation schemes to estimate the nucleus of an optimum search set. In various embodiments of the invention different schemes, discussed hereinbelow, are used to estimate the transmit symbols and to find the search set around the estimated transmit symbols. The method and apparatus of the present invention can be applied to any communication system with multiple transmit streams.

In one embodiment of the invention, a communication system implementing the present invention comprises a plurality of transmit sources operable to transmit a plurality of symbols over a plurality of channels, wherein the detector is operable to receive symbols corresponding to said transmitted symbols. The detector processes the received symbols to obtain initial estimates of said transmitted symbols and then uses the initial estimates to generate a plurality of reduced search sets. The reduced search sets are then used to generate decisions for detecting said transmitted symbols. In various embodiments of the invention, the decisions for detecting the symbols can be hard decisions or soft decisions. Furthermore, in various embodiments of the invention, the initial estimates can be obtained using a plurality of linear equalization techniques, including zero-forcing equalization, minimum-mean-squared-error equalization. The initial estimate can also be obtained by nulling and canceling techniques. In various embodiments of the invention, the data output corresponding to the transmitted symbols can be obtained using a log-likelihood probability ratio.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method and apparatus for an improved wireless communication system is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of communication systems to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
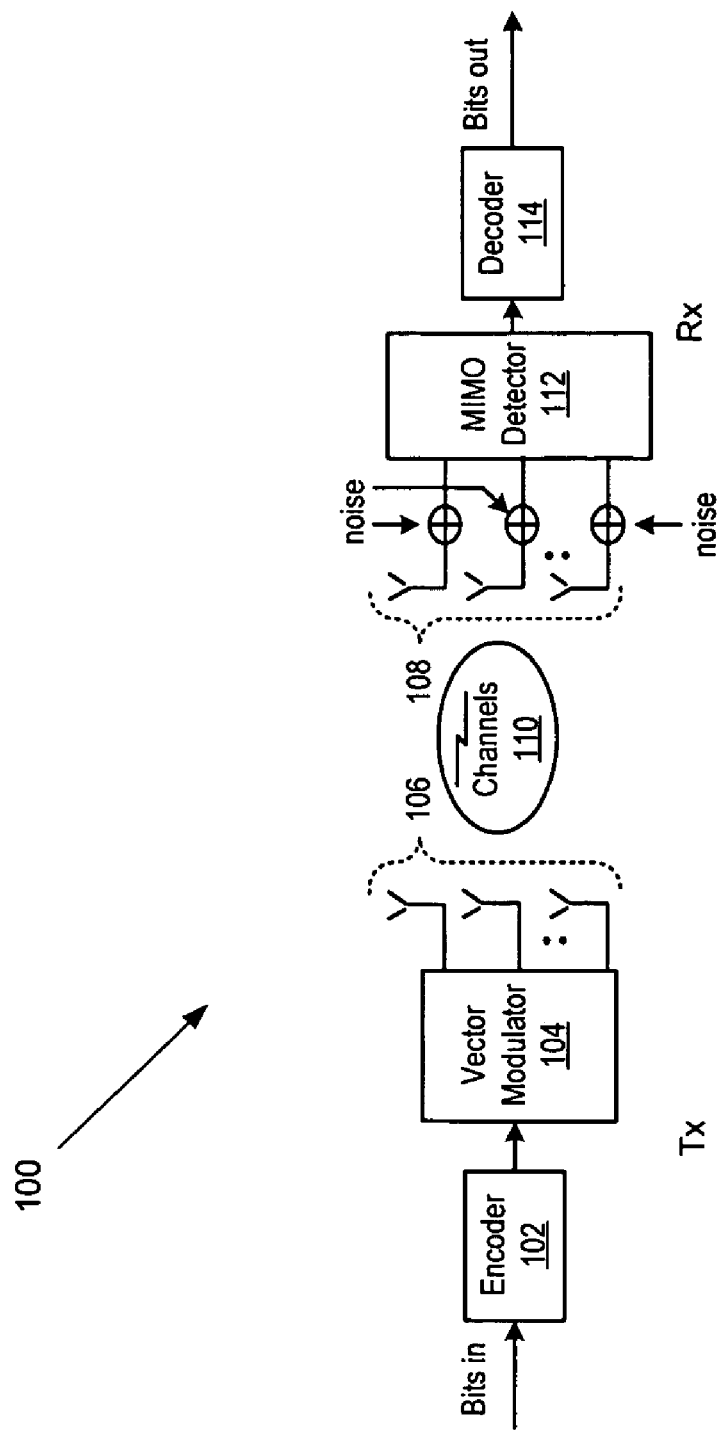
FIG. 1 is an illustration of the generalized functional components for implementing a MIMO system with a plurality of transmit antennas and a plurality of receive antennas.

FIG. 1 is an illustration of the functional components of a generalized communication system 100 for implementing a MIMO system with two transmit antennas and two receive antennas. A bit stream is received by encoder 102 which generates an encoded input for the vector modulator 104. A plurality of antennas 106 and 108 are operable to communicate over a plurality of communication channels 110, thereby defining a plurality of MIMO communication channels. As will be understood by those of skill in the art, the data received by antennas 108 will contain noise. The MIMO detection module 112 is operable to process the incoming data to provide "soft" or "hard" decisions regarding the received data. These "soft" or "hard" decisions are used by the detector 114 to generate an accurate output bit stream that avoids corruption related to the effects of noise.

Figure 2:
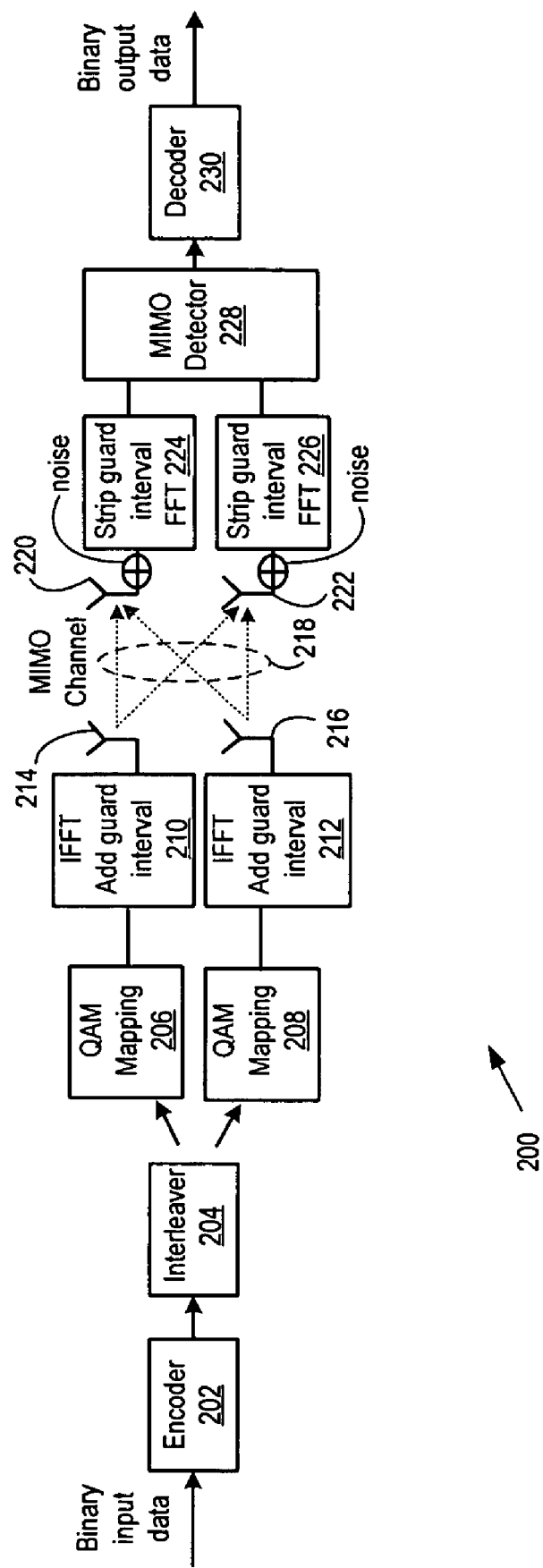
FIG. 2 is an illustration of the generalized functional components for implementing a MIMO system with two transmit antennas and two receive antennas for a system using orthogonal frequency division multiplexing.

FIG. 2 is an illustration of the functional components of a communication system 200 for implementing MIMO communications using OFDM with two transmit antennas and two receive antennas. The illustration in FIG. 2 is operable to binary input data using a MIMO protocol for a WLAN. The MIMO system 200 in FIG. 2 comprises an encoder 202 and an interleaver 204. The output from the interleaver 204 is separated into first and second data streams that are provided to QAM mapping modules 206 and 208. The QAM mapping modules 206 and 208 provide quadrature amplitude modulated data streams that are provided to inverse fast Fourier transform (IFFT) add guard interval modules 210 and 212, respectively. The IFFT add guard interval modules 210 and 212 transmit modulated data streams via antennas 214 and 216. As will be understood by those of skill in the art, the data transmitted by antennas 214 and 216 can be propagated by MIMO multipath channels 218 between the various transmit and receive antennas. The signals received by antennas 220 and 222 are processed by strip guard interval fast Fourier transform (FFT) modules 224 and 226, that generate inputs to the MIMO detection module 228. The processed signals from the strip guard interval FFT modules are processed by the MIMO detection module 228 which then provides "soft" or "hard" decisions to the decoder 230 to generate a binary output data stream.

Figure 3A:
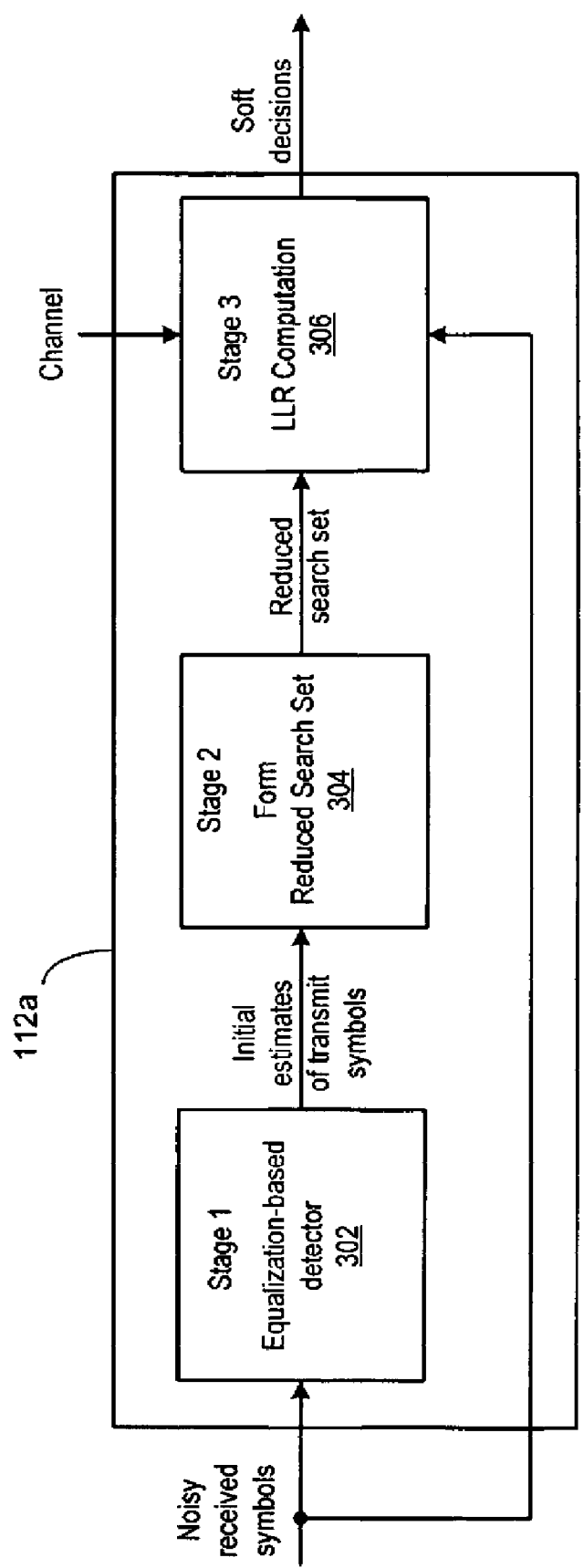
FIG. 3A is a block diagram illustration of the functional components of a MIMO detector in accordance with one embodiment of the present invention wherein the detector generates a "soft" decision.

FIG. 3a is an illustration of the functional components of a MIMO soft detector 112a in accordance with the present invention for generating soft decisions for data streams comprising noisy signals. The incoming data is processed in three stages. In the first stage 302, the noisy received symbols are processed by an equalization-based detector to generate initial estimates of the transmitted symbols using techniques discussed in greater detail below. In the second stage 304, the initial estimates are processed to form a reduced search set based on predetermined criteria discussed below. In the third stage 306, LLR computation is performed over the reduced search to generate soft decisions for use by the decoder 114.

Figure 3B:
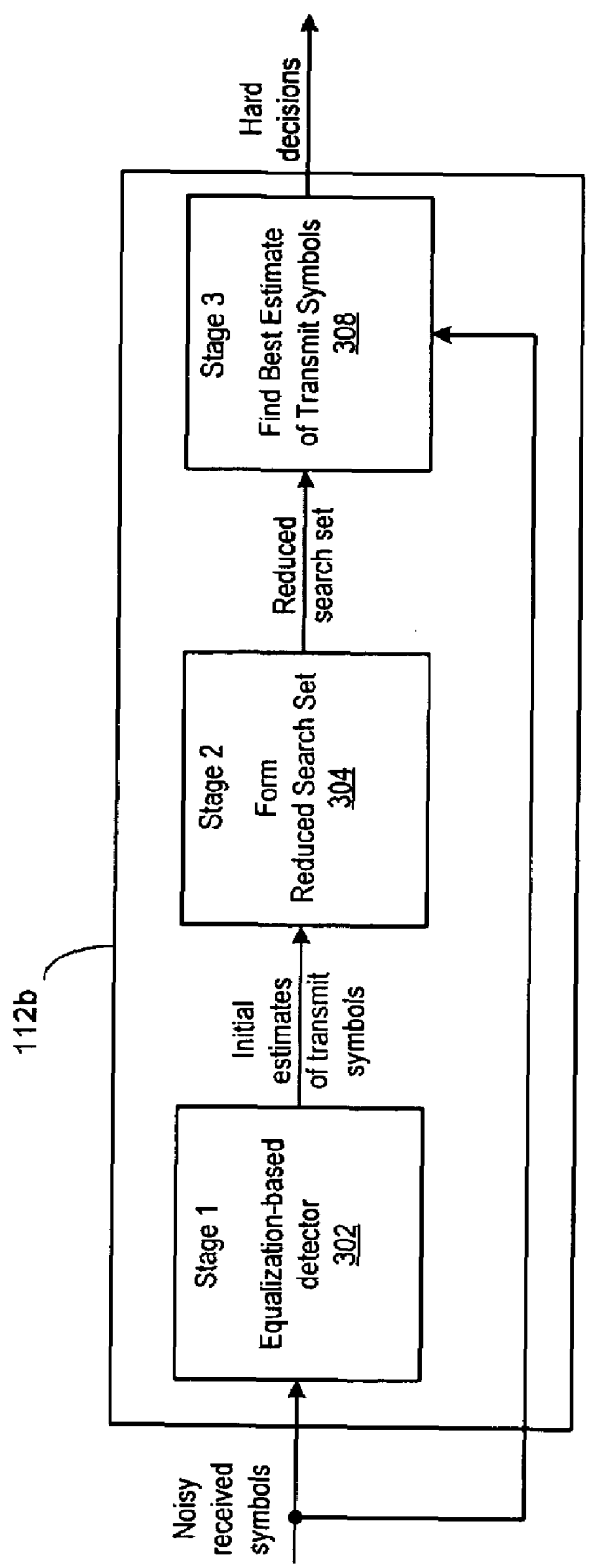
FIG. 3B is a block diagram illustration of the functional components of a MIMO detector in accordance with one embodiment of the present invention wherein the detector generates an estimate used to make a hard decision.

FIG. 3b is an illustration of the functional components of a MIMO hard detector 112b in accordance with the present invention for generating hard decisions for data streams comprising noisy signals. The incoming data is processed in three stages. In the first stage 302, the noisy received symbols are processed by an equalization-based detector to generate initial estimates of the transmitted symbols using techniques discussed in greater detail below. In the second stage 304, the initial estimates are processed to form a reduced search set based on predetermined criteria discussed below. In the third stage 308, the best estimate of the transmit symbols is found over the reduced search set. From this best estimate hard decisions are generated for use by the decoder 114. Since the corresponding bit mapping is known, the decoder receives bits rather than probabilistic data.

As will be understood by those of skill in the art, a MIMO soft decoder estimates the reliability of each possible decision regarding a received symbol without making an actual decision regarding the symbol. The decoder uses the estimated reliabilities, or soft decisions, provided by the MIMO soft detector to decode the received symbols, thereby generating a decoded binary output data stream.

The method and apparatus of the present invention can be understood by considering the processing of received signals by the MIMO detection module 112 in a generalized communication system such as that illustrated in FIG. 1 with $N_t$ transmit antennas and $N_r$ receive antennas. If the channel is a narrowband flat-fading channel or if OFDM modulation format is used, this $N_t \times N_r$ system can be described by the following model:

$$\begin{bmatrix} y_1(n) \\ y_2(n) \\ \vdots \\ y_{Nr}(n) \end{bmatrix} = \begin{bmatrix} H_{11}(n) & H_{12}(n) & \ldots & H_{1Nt}(n) \\ H_{21}(n) & H_{22}(n) & \ldots & H_{2Nt}(n) \\ \vdots & \vdots & \ddots & \vdots \\ H_{Nr1}(n) & H_{Nr2}(n) & \ldots & H_{NrNt}(n) \end{bmatrix} \begin{bmatrix} x_1(n) \\ x_1(n) \\ \vdots \\ x_{Nt}(n) \end{bmatrix} + \begin{bmatrix} N_1(n) \\ N_1(n) \\ \vdots \\ N_{Nt}(n) \end{bmatrix} \quad \text{Eq 1}$$

$$y(n) = H(n) \times (n) + N(n) \quad \text{Eq 2}$$

Where: n is the time or frequency index
y is the $N_r \times 1$ receive vector
H is the $N_r \times N_t$ channel matrix
x is the $N_t \times 1$ transmit vector
N is the $N_r \times 1$ noise vector Without loss of generality, the time/frequency index is dropped and the model becomes $$y = Hx + N \quad \text{Eq 3}$$

In addition, it can be assumed that the channel matrix H is perfectly known at the receiver and that the noise samples $N_i$ are independent complex Gaussian variables with zero mean and variance $\sigma^2$.

From Equation 1, the received signal at antenna j, $y_j$, is a noisy superposition of the $N_t$ transmitted symbols, $x_i$, that are corrupted by the channel matrix H as described by the following equation:

$$y_j = \sum_{i=1}^{N_t} H_{ji} x_i + N_j, \quad j = 1, \ldots, N_r \quad \text{Eq 4}$$

Each symbol $x_i$ is mapped from $\log_2(M)$ bits where M is the size of the constellation. For example, if $x_i$ is drawn from a 4-QAM constellation, then each $x_i$ is mapped from 2 bits. In Equation 4, the total number of bits transmitted is $N_t \log_2(M)$ bits. This will hereinafter be denoted as a transmit bit vector $[b_1 b_2 \ldots b_L]$ where $L = N_t \log_2(M)$.

As discussed hereinabove, the soft-output maximum-likelihood detector 228 is optimum because it minimizes the probability of incorrect decisions. The soft-output maximum-likelihood detector 228 receives y and searches over all possible transmit symbol vectors x to produce soft information about the likelihood of the transmitted bits $b_1$, $1 = 1, \ldots, N_t \log_2(M)$ being a 0 or a 1.

The soft information of each $b_1 = 0$ or 1 is in the form of the log-likelihood ratio (LLR) of the a priori probability of $b_1 = 0$ or 1.

For an $N_t \times N_r$ M-QAM system as defined by Equation 3, the vector of $[b_1 b_2 \ldots b_L]$ bits where $L = N_t \log_2(M)$ is mapped into $[x_1 x_2 \ldots x_{Nt}]$ symbols and is transmitted. The LLR of bit $b_1$, $1 = 1, 2, \ldots L$, is:

$$LLR(b_l) = \ln \frac{Pr(b_l = 0 \mid y)}{Pr(b_l = 1 \mid y)} = \ln \frac{\sum_{\forall x_j s.t. b_l = 0} Pr(x_j \mid y)}{\sum_{\forall x_j s.t. b_l = 1} Pr(x_j \mid y)} \quad \text{Eq 5}$$

where $j = 1, \ldots M^{Nt}$ denotes all possible transmit symbol vectors, y is the received symbol vector.

Applying Bayes' rule, LLR($b_1$) can be rewritten as:

$$LLR(b_l) = \ln \frac{\sum_{\forall x_j s.t. b_l=0} Pr(y|x_j)Pr(x_j)}{\sum_{\forall x_j s.t. b_l=1} Pr(y|x_j)Pr(x_j)} = \ln \frac{\sum_{\forall x_j s.t. b_l=0} Pr(y|x_j)}{\sum_{\forall x_j s.t. b_l=1} Pr(y|x_j)} \quad \text{Eq 6}$$

where the last simplification is based on the assumption that $x_j$'s are equi-probable.

Given the channel matrix H, $$LLR(b_l) = \ln \frac{\sum_{\forall x_j s.t. b_l=0} e^{\left(-\frac{\|y-Hx_j\|^2}{\sigma^2}\right)}}{\sum_{\forall x_j s.t. b_l=1} e^{\left(-\frac{\|y-Hx_j\|^2}{\sigma^2}\right)}} \quad \text{Eq 7}$$

Next, applying the standard max-log approximation, Eq 6 can be further simplified by keeping only the largest term in the summation in both the numerator and denominator, $$L\hat{L}R(b_l) = \frac{1}{\sigma^2}\left(\min_{\forall x_j s.t. b_l=1} \|y-Hx_j\|^2 - \min_{\forall x_j s.t. b_l=0} \|y-Hx_j\|^2\right), \quad \text{Eq 8}$$

Figure 4:
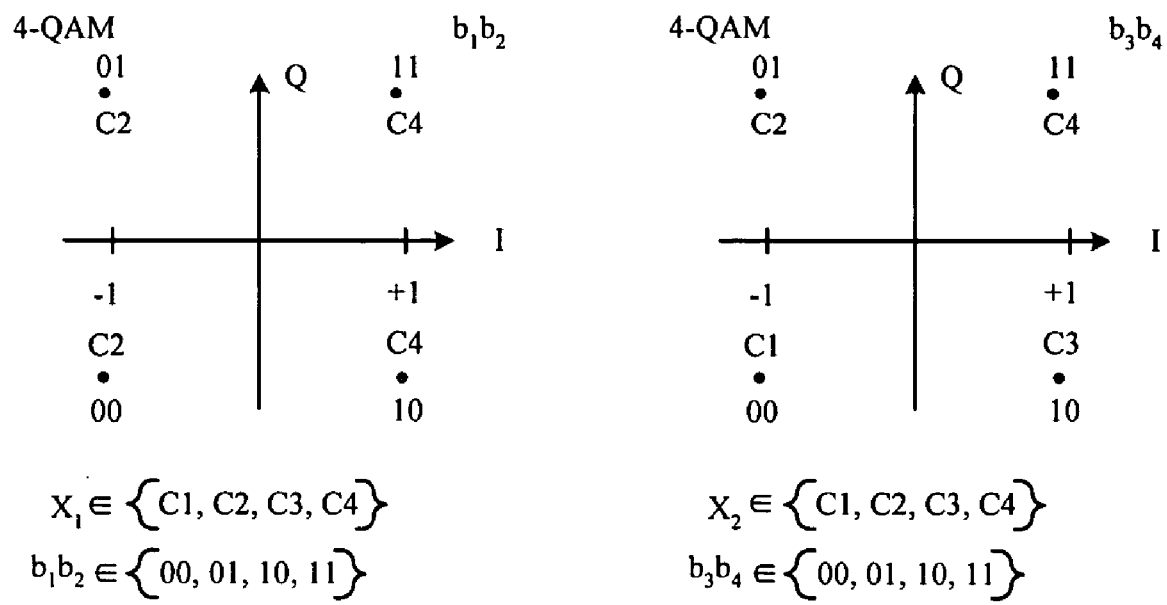
FIG. 4 is an illustration of a 4-QAM constellation of symbols processed by the MIMO detector of FIG. 1.

In a 2×2 4-QAM system, the transmitted symbols $x_1$, $x_2$ in Equation 1 are each drawn from a 4-QAM constellation as shown in FIG. 4.

Table 1 lists all the 16 combinations of transmit symbol vectors [$x_1$ $x_2$].

TABLE 1

| j | $x_j = x_1 x_2$ | $b_1 b_2 b_3 b_4$ |
|---|---|---|
| 1 | C1C1 | 0000 |
| 2 | C1C2 | 0001 |
| 3 | C1C3 | 0010 |
| 4 | C1C4 | 0011 |
| 5 | C2C1 | 0100 |
| 6 | C2C2 | 0101 |
| 7 | C2C3 | 0110 |
| 8 | C2C4 | 0111 |
| 9 | C3C1 | 1000 |
| 10 | C3C2 | 1001 |
| 11 | C3C3 | 1010 |
| 12 | C3C4 | 1011 |
| 13 | C4C1 | 1100 |
| 14 | C4C2 | 1101 |
| 15 | C4C3 | 1110 |
| 16 | C4C4 | 1111 |

C1 = −1 − j
C2 = −1 + j
C3 = 1 − j
C4 = 1 + j

From Equation 8, the approximate LLRs of $b_1$, $b_2$, $b_3$ and $b_4$ can be computed as follows:

$$L\hat{L}R(b_1) = \frac{1}{\sigma^2}\left(\min_{\forall x_j, j=9,\ldots,16} \|y-Hx_j\|^2 - \min_{\forall x_j, j=1,\ldots,8} \|y-Hx_j\|^2\right) \quad \text{Eq 9}$$

$$L\hat{L}R(b_2) = \frac{1}{\sigma^2}\left(\min_{\substack{\forall x_j, j=5,\ldots,8 \\ 13,\ldots,16}} \|y-Hx_j\|^2 - \min_{\substack{\forall x_j, j=1,\ldots,4 \\ 9,\ldots,12}} \|y-Hx_j\|^2\right) \quad \text{Eq 10}$$

$$L\hat{L}R(b_3) = \frac{1}{\sigma^2}\left(\min_{\substack{\forall x_j, j=3,4,7,8 \\ 11,12,15,16}} \|y-Hx_j\|^2 - \min_{\substack{\forall x_j, j=1,2,5,6 \\ 9,10,13,14}} \|y-Hx_j\|^2\right) \quad \text{Eq 11}$$

$$L\hat{L}R(b_l) = \frac{1}{\sigma^2}\left(\min_{\forall x_j, j=even} \|y-Hx_j\|^2 - \min_{\forall x_j, j=odd} \|y-Hx_j\|^2\right) \quad \text{Eq 12}$$

As will be understood by those of skill in the art, the ML detector is optimal and is able to fully exploit the available diversity inherent in the channel matrix H. Thus the ML detector can realize substantial improvements over suboptimal equalization-based detection methods. The disadvantage of the ML detector, however, is that it requires an exhaustive search to find the LLRs of each bit. Moreover, the computational complexity of the ML detector grows exponentially with $N_t$, the number of transmitter antennas.

In the method and apparatus of the present invention, an initial estimate of the transmitted symbols is be obtained, and is used to reduce the search set to N (N<M) symbols that are closest by some criteria to the estimated transmitted symbols. Various embodiments of the present invention use optimizing criteria for determining the reduced search set in the present invention, as described hereinbelow.

In one embodiment of the present invention the optimizing criteria comprises linear equalization as defined by the following equation:

$$\hat{x} = Q(Wy) \quad \text{Eq 13}$$

where W is the linear equalization matrix and Q(.) denotes the slicing operation according to the constellation used. In an embodiment of the invention, the linear equalization matrix is defined by a Zero-forcing (ZF) equalizer:

$$W = (H^H H)^{-1} H^H \quad \text{Eq 14}$$

which is the pseudo-inverse of H. In this equation, it is assumed that $N_1 > N_t$. In another embodiment of the invention, the equalization matrix is defined by a Minimum-mean-squared-error (MMSE) equalizer:

$$W = \left(H^H H + \frac{1}{SNR} I\right)^{-1} H^H \quad \text{Eq 15}$$

In alternative embodiment of the invention, the optimizing criteria comprises nulling and canceling. As opposed to linear equalization where all components of $\hat{x}$ are estimated jointly, the nulling and canceling approach estimates the components of $\hat{x}$ sequentially. For example, if $\hat{x}_1$ is first estimated using either the ZF or MMSE linear equalization approach, then its contribution to the received vector y is subtracted from y. The modified received vector y is then used for estimating the next transmitted symbol. The whole process is repeated until all components of $\hat{x}$ have been estimated.

The criteria for reducing the search set can be understood from the following discussion in conjunction with the illustrations shown in FIGS. 5-8. For discussion purposes, let Ni be the number of symbols closest by some criteria to the estimated transmit symbol $\hat{x}_1$. A first criterion (hereinafter criterion 1) can be stated as follows:

Criterion 1—If bit $b_k$ belongs to $\hat{x}_m$, then for each $b_k$=0 or 1, find among all constellation points that are encoded with $b_k$=0 or 1, the $N_m$ constellation points that are closest in Euclidean distance to $\hat{x}_m$. For the other transmit symbols, $\hat{x}_{i,i\neq m}$, $N_i$ is simply the $N_i$ constellation points that are closest in Euclidean distance to $\hat{x}_i$.

Figure 5:
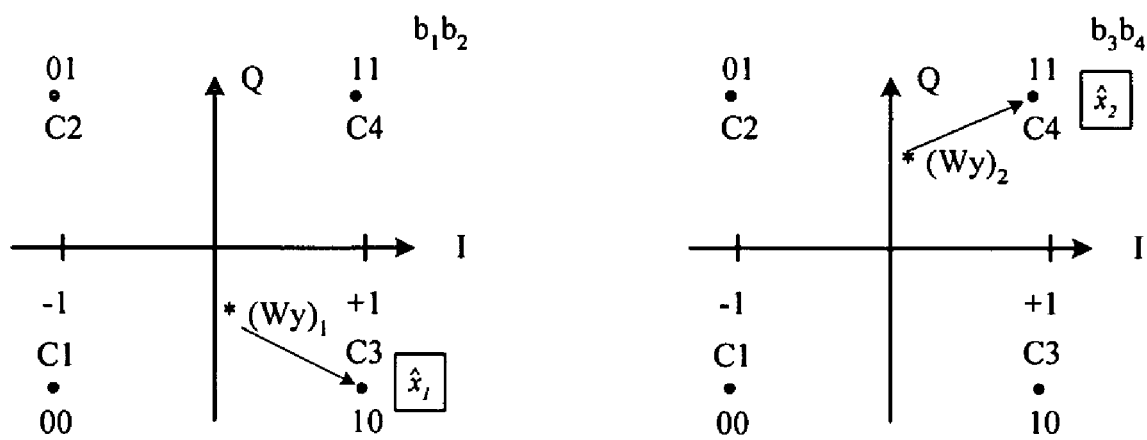
FIG. 5 is an illustration of a constellation of symbols processed by the MIMO detector of FIG. 1 by equalizing the received vector to produce noisy estimates and slicing the noisy estimates to nearest constellation points.

In a 2×2 4-QAM system, the received vector y is equalized to produce noisy estimates Wy. The noisy estimates Wy are then sliced to the nearest constellation points $\hat{x}_1$ and $\hat{x}_2$. These estimated transmit symbols are illustrated in FIG. 5.

Furthermore, if $N_1$ and $N_2$ are "2":

TABLE 2

| | Search set for $\hat{X}_1$ | Search set for $\hat{X}_2$ | Candidate transmit symbol vectors |
|---|---|---|---|
| $b_1 = 0$ | C1, C2 | C4, C2 | {C1C4, C1C2, C2C4, C2C2} |
| $b_1 = 1$ | C3, C4 | C4, C2 | {C3C4, C3C2, C4C4, C4C2} |
| $b_2 = 0$ | C3, C1 | C4, C2 | {C3C4, C3C2, C1C4, C1C2} |
| $b_2 = 1$ | C4, C2 | C4, C2 | {C4C4, C4C2, C2C4, C2C2} |
| $b_3 = 0$ | C1, C3 | C2, C1 | {C1C2, C1C1, C3C2, C3C1} |
| $b_3 = 1$ | C1, C3 | C4, C3 | {C1C4, C1C3, C3C4, C3C3} |
| $b_4 = 0$ | C1, C3 | C2, C1 | {C1C2, C1C1, C3C2, C3C1} |
| $b_4 = 1$ | C1, C3 | C4, C3 | {C1C4, C1C3, C3C4, C3C3} |

For each $b_k$=0 or 1, the number of candidate transmit symbol vectors has been reduced to 4 from 8 in this embodiment.

The following are the possible approaches for Criterion 2:

(1) Find the Ni closest (in Euclidean distance) constellation points to each estimated transmit symbol $\hat{x}_i$;

(2) Search over this reduced set for the transmit symbol vector that minimizes $\|y-Hx\|^2$. This transmit symbol vector is denoted as $x_c=[x_{c,1}\ x_{c,2}]$;

(3) $x_c=[x_{c,1}\ x_{c,2}]$ is the candidate transmit symbol vector for the corresponding bits that are mapped into $x_c$; and (4) For the bit values that are not part of $x_c$, there are several ways to compute the approximate LLRs, discussed in greater detail hereinbelow.

Figure 6:
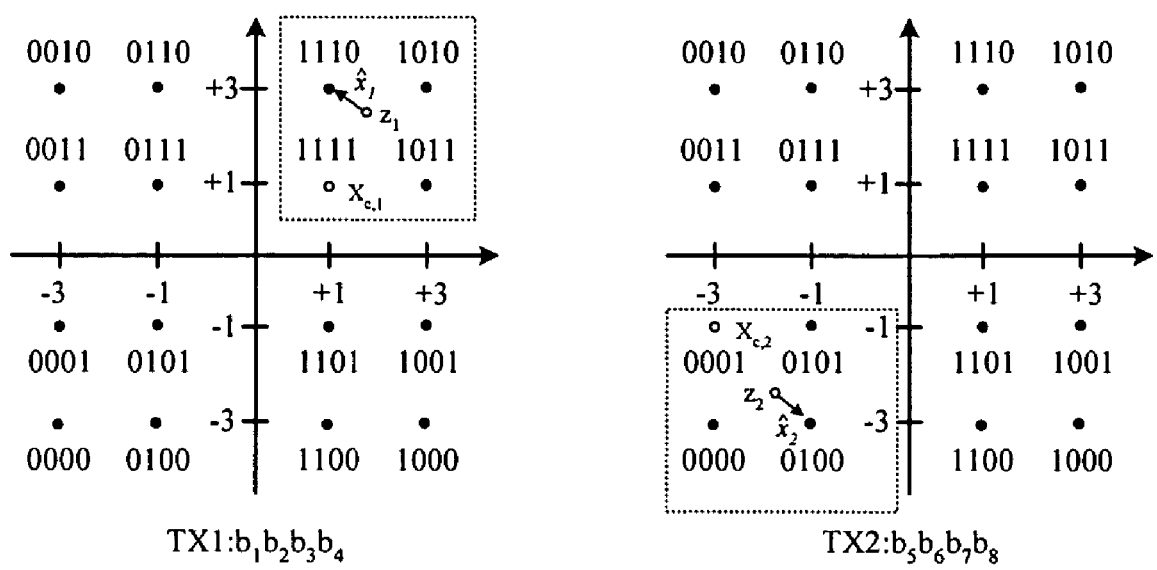
FIG. 6 is an illustration of a 2×2 16 QAM constellation of symbols processed by the MIMO detector of FIG. 1 to obtain a reduced set of possible transmit symbol vectors.

FIG. 6 is an illustration of a 2×2 16-QAM example, processed using the method described herein where z denotes the initial estimate. $\hat{x}=Q(z)$ is z sliced to the nearest constellation points. Furthermore, $N_1$ and $N_2$ are 4. Hence, the 4 closest constellation points to $\hat{x}_1$ and $\hat{x}_2$ are contained in the rectangular grids. Together, they make up a reduced search set of 16 possible transmit symbol vectors out of which $x_c$ is assumed to minimize $\|y-Hx\|^2$. The bit representation of $x_c$ is [11110001].

From the discussion above with regard to FIG. 6, it can be seen that, $x_c$ minimizes $\|y-Hx\|^2$ in the reduced search set. Bit-wise, $\|y-Hx_c\|^2$ is the minimum metric for $b_1$=1, $b_2$=1, $b_3$=1, $b_4$=1, $b_5$=0, $b_6$=0, $b_7$=0 and $b_8$=1. To complete the LLR computation of each bit in Equation 8, the minimum metric must be approximated for $b_1$=0, $b_2$=0, $b_3$=0, $b_4$=0, $b_5$=1, $b_6$=1, $b_7$=1 and $b_8$=0. This is step 4 of criterion 2.

Step 4 of criterion 2 involves different methods to derive the metrics of the missing bit values in order to complete the LLR calculation of each bit. If b1=0 is not part of the bit representation of xc, the metric for b1=0 can be computed in a number of different ways:

(1) Method 1—search over all possible transmit symbol vectors;

(2) Method 2—slice the element of $x_c$ that contains bit $b_1$ to the closest P symbols with $b_1$=0. For the other elements of $x_c$ that do not contain bit $b_1$, find the Q closest symbols to these elements of $x_c$. These P and Q symbols make up the reduced set of possible transmit symbol vectors;

(3) Method 3—slice the element of xc that contains bit $b_1$ to the closest P symbols that share the same I-level or Q-level with $b_1$=0. For the other elements of $x_c$ that do not contain bit $b_1$, find the Q closest symbols to these elements of $x_c$. These P and Q symbols make up the reduced set of possible transmit symbol vectors; or (4) Method 4—set the metric to some fixed value that is pre-determined to be sufficiently high. All of the above applies for the case where $b_1$=1 is not part of the but representation of $x_c$.

Figure 7:
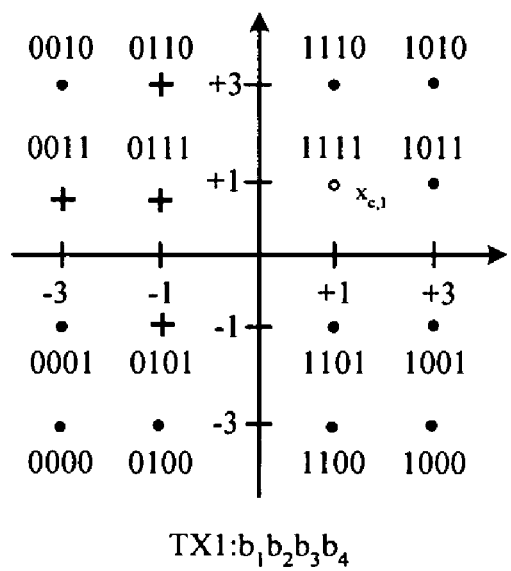
FIG. 7 is an illustration of the 2×2 16 QAM constellation of symbols of FIG. 4 further processed by a first method to complete the LLR calculation for each bit.
Figure 7:
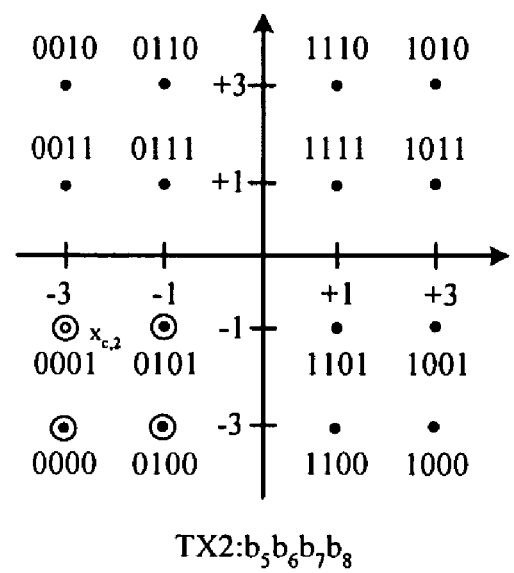

FIG. 7 and the following discussion illustrates how to derive the metric for $b_1$=0 using Method 2 of Step 4 (Method 1 calls for searching ALL possible transmit symbol vectors and hence doesn't require any illustration). Let P and Q be 4. Since $b_1$ belongs to $x_{c,1}$, we slice $x_{c,1}$ to the 4 closest symbols (denoted as '+') with $b_1$=0. Since $x_{c,2}$ does not have bit $b_1$, we simply search for the 4 closest symbols to $x_{c,2}$ (circled and including $x_{c,2}$). Out of these 16 possible transmit symbol vectors (made up of the '+' and circled symbols), we can then compute the metric for $b_1$=0. The same process is repeated for the metric computation of $b_2$=0, $b_3$=0, $b_4$=0, $b_5$=1, $b_5$=1, $b_6$=1, $b_7$=1 and $b_8$=0.

Figure 8:
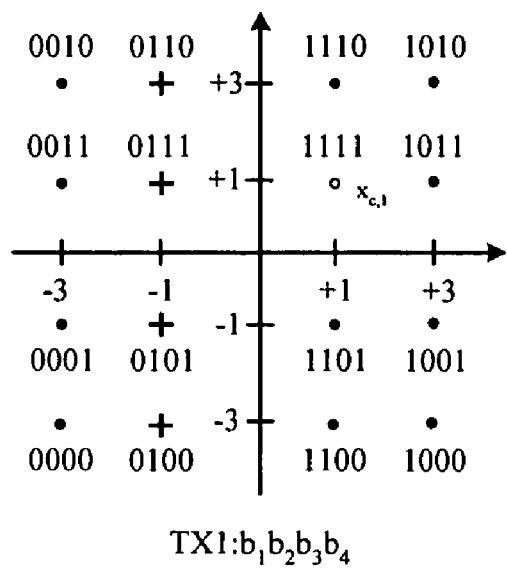
FIG. 8 is an illustration of a 2×2 16 QAM constellation of symbols of FIG. 4 further processed by a second method to complete the LLR calculation for each bit.
Figure 8:
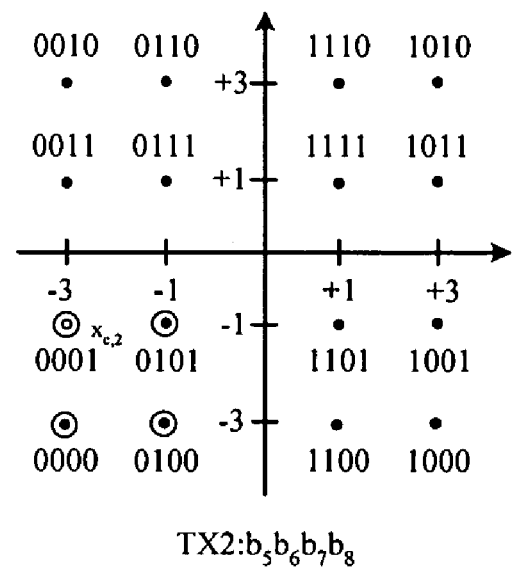

FIG. 8 and the following discussion illustrate how to compute the metric for $b_1$=0 using Method 3. Again, P and Q will be 4. Both the −1 and −3 I-levels have $b_1$=0. Since $b_1$ belongs to $x_{c,1}$, we slice $x_{c,1}$ to the 4 symbols on the closest I-level, which is the −1 I-level (denoted as '+'). Since $x_{c,2}$ doesn't have bit $b_1$, we simply search for the 4 closest symbols to $x_{c,2}$ (circled and including $x_{c,2}$). Out of these 16 possible transmit symbol vectors (made up of '+' and circled symbols), we can then compute the metric for $b_1$=0. The same process is repeated for the metric computation of $b_2$=0, $b_3$=0, $b_4$=0, $b_5$=1, $b_5$=1, $b_6$=1, $b_7$=1 and $b_8$=0.

As can be seen from the foregoing discussion, the method and apparatus of the present invention provides a reduced-complexity maximum-likelihood detector that provides a high degree of signal detection accuracy while maintaining high processing speeds. Those of skill in the art will appreciate that the teachings of the present invention can be modified by using different schemes to estimate the transmit symbols and to find the search set around the estimated transmit symbols. The invention can be applied to any communication system with multiple transmit streams.

Although the present invention has been described in detail, it should be understood that various changes, substitutions and alterations can be made hereto without departing from the spirit and scope of the invention as defined by the appended claims. invention as defined by the appended claims.

What is claimed is:

1. A communication receiver comprising:
a detector operable to:
receive symbols corresponding to transmitted symbols in a multiple-antenna system;
process the received symbols to obtain initial estimates of the transmitted symbols by equalization;
determining from the obtained initial estimates selected number of points that are closest in Euclidean distance to an initial estimate for each symbol;
generating for each symbol, a reduced set of constellation points obtained as the closest in Euclidean distance;

searching over the reduced set of constellation points for a transmit vector that minimizes a channel calculation $\|y-Hx\|^2$ to obtain a bit-wise minimum metric;

using the bit-wise minimum metric as the transmit symbol vector for corresponding bits that map into the transmit symbol vector for log-likelihood probability ratio calculations;

deriving bit metrics for remaining points in the reduced set which did not minimize to the channel calculation $\|y-Hx\|^2$; and using the derived bit metrics for the remaining points for completing the log-likelihood probability ratio calculations to generate decisions for detecting the transmitted symbols.

2. The communication receiver of claim 1, wherein the decisions are soft decisions.

3. The communication receiver of claim 1, wherein the decisions are hard decisions.

4. The communication receiver of claim 1, wherein the equalization is obtained by using a zero-forcing equalizer.

5. The communication receiver of claim 1, wherein the equalization is obtained by using a minimum-mean-squared-error equalizer.

6. The communication receiver of claim 1, wherein the received symbols are equalized to produce initial estimates that are noisy estimates.

7. A method of communicating data comprising:

receiving symbols corresponding to transmitted symbols in a multiple-antenna system;

processing the received symbols to obtain initial estimates of the transmitted symbols by equalization;

determining from the obtained initial estimates selected number of points that are closest in Euclidean distance to an initial estimate for each symbol;

generating for each symbol, a reduced set of constellation points as the closest in Euclidean distance;

searching over the reduced set of constellation points for a transmit vector that minimizes a channel calculation $\|y-Hx\|^2$ to obtain a bit-wise minimum metric;

using the bit-wise minimum metric as the transmit symbol vector for corresponding bits that map into the transmit symbol vector for log-likelihood probability ratio calculations;

deriving bit metrics for remaining points in the reduced set which did not minimize to the channel calculation $\|y-Hx\|^2$; and using the derived bit metrics for the remaining points for completing the log-likelihood probability ratio calculations to generate decisions for detecting the transmitted symbols; and using the decisions generated to recover the transmitted symbols.

8. The method of claim 7, wherein the decisions generated are soft decisions.

9. The method of claim 7, wherein the decisions generated are hard decisions.

10. The method of claim 7, wherein the equalization is obtained by using a zero-forcing equalizer.

11. The method of claim 7, wherein the equalization is obtained by using a minimum-mean-squared-error equalizer.

12. The method of claim 7, wherein the received symbols are equalized to produce initial estimates that are noisy estimates.

* * * * *